US008248947B2

United States Patent
Li et al.

(10) Patent No.: US 8,248,947 B2
(45) Date of Patent: Aug. 21, 2012

(54) METHODS AND APPARATUS FOR IMPROVING POWER EFFICIENCY AND LATENCY OF MOBILE DEVICES USING AN OUT OF BAND WIRELESS RESOURCE

(75) Inventors: Junyi Li, Chester, NJ (US); Saurabh Tavildar, Jersey City, NJ (US); Aleksandar Jovicic, Piscataway, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 12/507,578

(22) Filed: Jul. 22, 2009

(65) Prior Publication Data

US 2011/0019541 A1    Jan. 27, 2011

(51) Int. Cl.
*G01R 31/08* (2006.01)
(52) U.S. Cl. .................................... 370/236; 370/389
(58) Field of Classification Search ................ None
See application file for complete search history.

(56) References Cited

U.S. PATENT DOCUMENTS

| 6,122,287 | A * | 9/2000 | Ohanian et al. ............... 370/465 |
| 7,512,094 | B1 | 3/2009 | Linebarger et al. |
| 7,764,680 | B2 * | 7/2010 | Matsumoto et al. .......... 370/389 |
| 7,778,220 | B2 * | 8/2010 | Sastry ............................ 370/329 |
| 2006/0116129 | A1 | 6/2006 | Gorsuch |
| 2006/0234766 | A1 | 10/2006 | Gillin et al. |
| 2009/0017824 | A1 * | 1/2009 | Lee et al. ....................... 455/437 |
| 2010/0029216 | A1 * | 2/2010 | Jovicic et al. .................. 455/68 |
| 2011/0019541 | A1 * | 1/2011 | Li et al. ........................... 370/230 |
| 2011/0028102 | A1 * | 2/2011 | Li et al. ........................... 455/71 |

FOREIGN PATENT DOCUMENTS

EP    1530316 A1    5/2005

OTHER PUBLICATIONS

International Search Report and Written Opinion—PCT/US2010/042814, International Search Authority—European Patent Office—Nov. 30, 2010.

* cited by examiner

*Primary Examiner* — Robert Wilson
(74) *Attorney, Agent, or Firm* — James O'Hare; Paul S. Holdaway

(57) ABSTRACT

Methods and apparatus of using a licensed spectrum to transmit data when an unlicensed spectrum is congested are disclosed. The method includes transmitting a first signal from a first mobile device to a second mobile device using an unlicensed spectrum, determining, at the first mobile device, whether a first response signal has been received by the first mobile device using the unlicensed spectrum, and transmitting a second signal from the first mobile device to the second mobile device using a licensed spectrum when the first response signal has not been received by the first mobile device using the unlicensed spectrum.

28 Claims, 4 Drawing Sheets

METHODS AND APPARATUS FOR IMPROVING POWER EFFICIENCY AND LATENCY OF MOBILE DEVICES USING AN OUT OF BAND WIRELESS RESOURCE

BACKGROUND

1. Field

The invention relates to wireless communications. More particularly, the invention relates to methods and apparatus for improving power efficiency and latency of mobile devices using an out of band wireless resource.

2. Background

Wireless communications continues to grow in demand and has become an integral part of both personal and business communications. Wireless communications allow users to transmit and receive data from most anywhere using wireless networks and wireless devices such as laptops, cellular devices, iPhones, BlackBerrys, etc.

Wireless devices are generally configured to operate in either a licensed frequency spectrum or an unlicensed frequency spectrum. Different countries have set aside different portions of the frequency spectrum as the licensed frequency spectrum and the unlicensed frequency spectrum for operation of wireless devices. As an example, in the United States, the 1.9 GHz spectrum has been used as a licensed spectrum for broadband wireless devices. Outside the United States, the 3.5 GHz spectrum has been the most widely used licensed spectrum for broadband wireless devices. The licensed spectrum includes all frequency bands that require a license to operate a wireless device. In the licensed spectrum, only the spectrum licensee can build infrastructure, and allow communications and offer services across its spectrum range. The licensed spectrum is more reliable and has less traffic congestion but generally has a narrower band when compared to the unlicensed spectrum. Hence, large amounts of data may take longer to transmit using the licensed spectrum.

The unlicensed spectrum includes all frequency bands that do not require a license to operate a wireless device. In the unlicensed spectrum, any user is free to use the frequency band for short range wireless communications. The unlicensed spectrum is inexpensive and has a larger band when compared to the licensed spectrum but is not controlled by any third party so can be unreliable and congested due to large amounts of data passing across these frequency bands. However, when the unlicensed spectrum is not congested, it can be useful for transferring large amount of data.

In the United States, the unlicensed spectrums are at 2.4 GHz and at 5.2 GHz, of which are both free to use. The Federal Communications Commission (FCC) currently sets requirements for the unlicensed spectrums such as limits on transmit power spectral density and limits on antenna gain.

Therefore, it has been recognized by those skilled in the art that a need exists for methods and apparatus for improving power efficiency and latency of mobile devices using both the licensed spectrum and the unlicensed spectrum.

SUMMARY

Methods and apparatus of using a licensed spectrum to transmit data when an unlicensed spectrum is congested are disclosed. The method includes transmitting a first signal from a first mobile device to a second mobile device using an unlicensed spectrum, determining, at the first mobile device, whether a first response signal has been received by the first mobile device using the unlicensed spectrum, and transmitting a second signal from the first mobile device to the second mobile device using a licensed spectrum when the first response signal has not been received by the first mobile device using the unlicensed spectrum.

An apparatus for using a licensed spectrum to transmit data when an unlicensed spectrum is congested is disclosed. The apparatus includes a processor configured to transmit a first signal to a mobile device using an unlicensed spectrum, determine whether a first response signal has been received using the unlicensed spectrum, and transmit a second signal to the mobile device using a licensed spectrum when the first response signal has not been received using the unlicensed spectrum.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
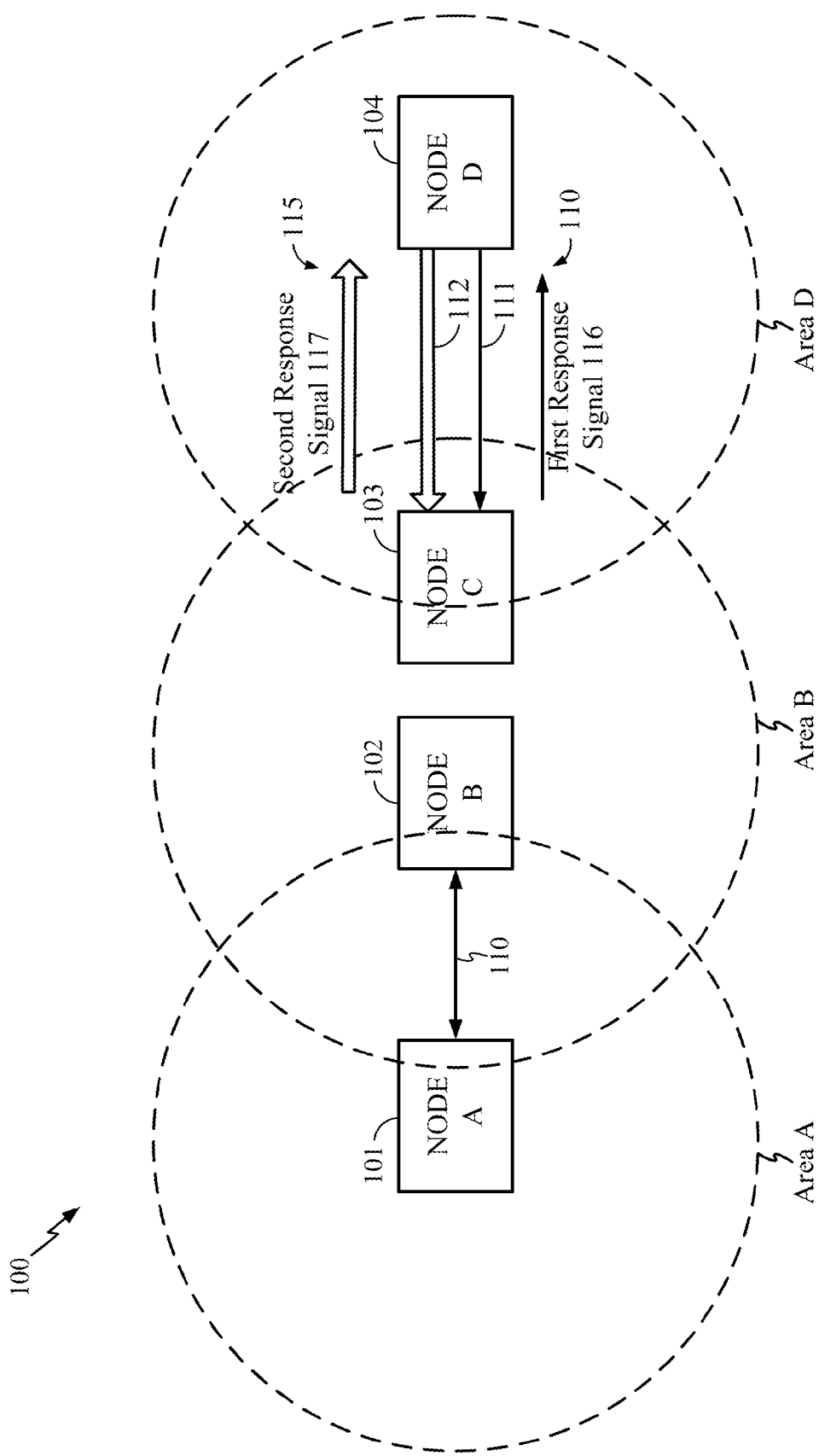
FIG. 1 is a simplified block diagram of a network having a plurality of nodes configured to operate in the licensed spectrum and the unlicensed spectrum in accordance with various embodiments.

FIG. 1 is a simplified block diagram of a network 100 having a plurality of nodes 101, 102, 103 and 104 configured to operate in the licensed spectrum and the unlicensed spectrum in accordance with various embodiments. In various embodiments, the network 100 can include one or more networks such as a WiFi network, an unlicensed network (i.e., a network operating in the unlicensed spectrum), a licensed network (i.e., a network operating in the licensed spectrum) and/or a carrier sense multiple access with collision avoidance (CSMA/CA) network and each of the plurality of nodes 101, 102, 103 and 104 can be a WiFi device or node, a mobile device or a wireless communications device configured to operate in the licensed spectrum and the unlicensed spectrum, a user, or a white-space device (WSD) configured to operate in the licensed spectrum and the unlicensed spectrum. A WSD can be a mobile device, a laptop computer or other portable device operating in open or unused frequencies. For illustrative purposes, the disclosure will discuss WiFi networks; however, other types of licensed and unlicensed networks are within the scope of the invention. Furthermore, even though four nodes 101, 102, 103 and 104 are shown in FIG. 1, the network 100 can include one or more nodes. For illustrative purposes, nodes 101, 102, 103 and 104 will also be referred to as node A, node B, node C and node D, respectively.

As an example, wireless (e.g., WiFi) communications, using the unlicensed spectrum, can begin by node A transmitting a control signal (e.g., a request to send (RTS) signal or an actual data signal if the WiFi network uses a carrier sense multiple access (CSMA) protocol) indicating that it would like to transmit to node B. After node B receives the control signal from node A, node B transmits a response signal (e.g., a clear to send (CTS) signal or an acknowledgment (ACK) packet or signal in the context of CSMA protocol) back to node A indicating that node B is ready to establish communications (i.e., secure the link) with node A or that communication with node A has been successful. Node D may want to send a control signal indicating that it would like to transmit to node C. Since node C is close to node B, node C will not send any signals back to node D. Node D will continue to try to establish communications with node C but will be unable to until nodes A and B have ceased communications for a long enough period of time for node C to recognize the ceased communications and transmit a response signal to node D. Should nodes A and B continue to communicate, node C and node D will experience increased latency. This may be referred to an extended hidden terminal problem.

Figure 2:
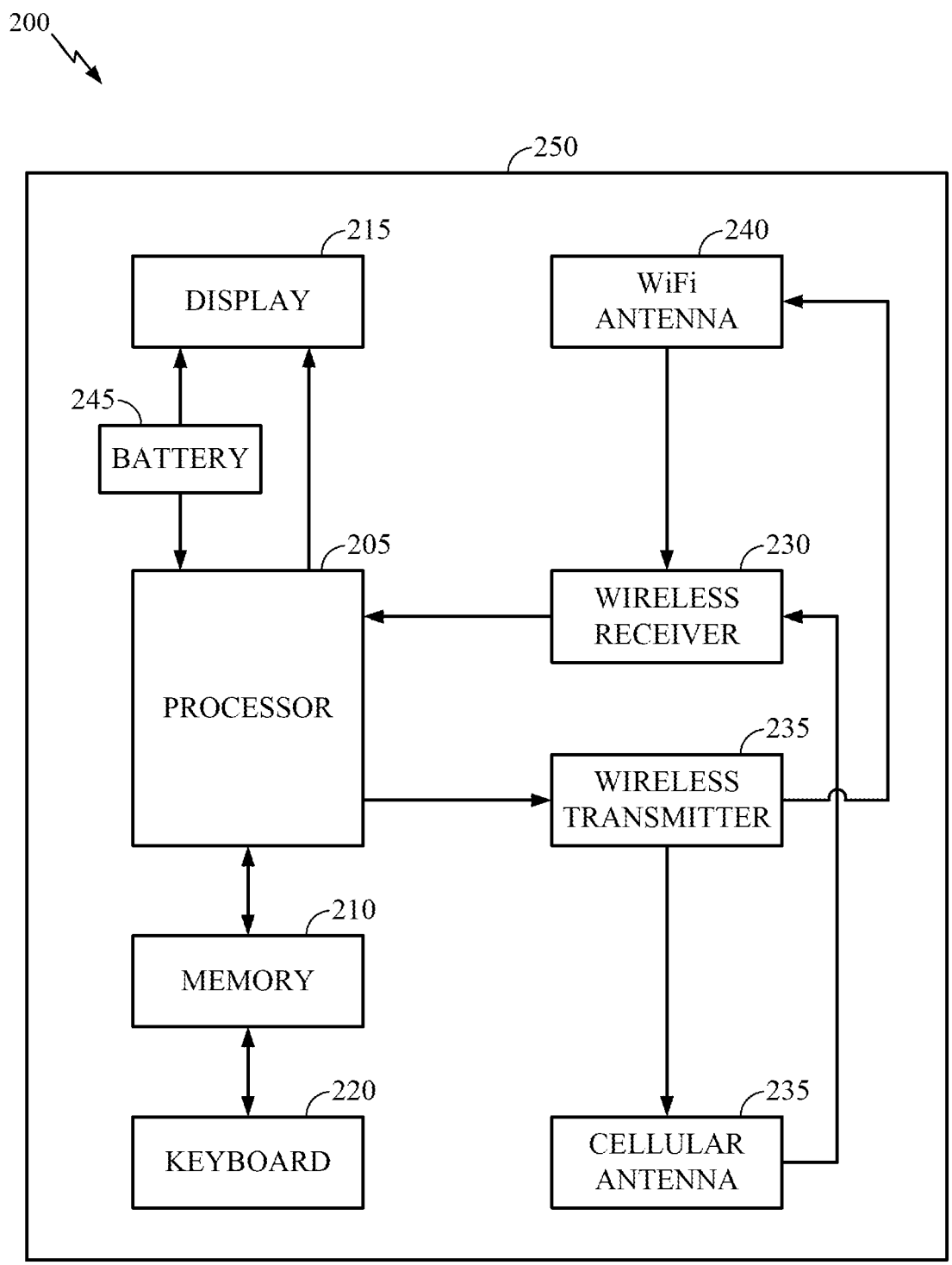
FIG. 2 is a block diagram of an exemplary node configured to operate in the licensed spectrum and the unlicensed spectrum in accordance with various embodiments.

FIG. 2 is a block diagram of an exemplary node configured to operate in the licensed spectrum and the unlicensed spectrum in accordance with various embodiments. For illustrative purposes, the term "node" will refer to a wireless communications device 200. The wireless communications device 200 is configured to communicate in the licensed spectrum and the unlicensed spectrum. The wireless communications device 200 includes a processor 205, a memory 210, a display 215, a keyboard 220, a wireless transmitter 225, a wireless receiver 230, a first antenna 235, a second antenna 240, and a battery 245. The chips, components or modules may be attached or formed on a printed circuit board 250. The printed circuit board 250 can refer to any dielectric substrate, ceramic substrate, or other circuit carrying structure for carrying signal circuits and electronic components within the wireless communications device 200.

The processor 205 may be implemented using hardware, software, firmware, middleware, microcode, or any combination thereof. The processor 225 may be an Advanced RISC Machine (ARM), a controller, a digital signal processor (DSP), a microprocessor, an encoder, a decoder, circuitry, a processor chip, or any other device capable of processing data, and combinations thereof. The term "circuitry" may include processor circuitry, memory circuitry, RF transceiver circuitry, power circuitry, video circuitry, audio circuitry, keyboard circuitry, and display circuitry.

The memory 210 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data.

The machine readable instructions may be stored in the memory 210 and may be executed by the processor 205 to cause the processor 205 to perform various functions as described in this disclosure. The display 215 may be a LCD, LED or plasma display screen and the keyboard 220 may be a standard keyboard (e.g., a QWERTY layout) having letters and numbers.

The wireless transmitter 225 is coupled to the processor 205 and is used to encode and format the data for transmission via the first antenna 235 and/or the second antenna 240. The wireless receiver 230 is coupled to the processor 205 and is used to decode and parse the data after being received from the first antenna 235 and/or the second antenna 240. The first antenna 235 may be positioned at a lower right portion of the wireless communications device 200 and the second antenna 240 may be positioned at an upper right portion of the wireless communications device 200. The first antenna 235 may be a cellular antenna, a GSM antenna, a CDMA antenna, a WCDMA antenna, or any other antenna capable of operating using the licensed spectrum. The second antenna 240 may be a WiFi antenna, a GPS antenna, or any other antenna capable of operating using the unlicensed spectrum. The battery 245 supplies power to the components or modules shown in FIG. 2.

Figure 3:
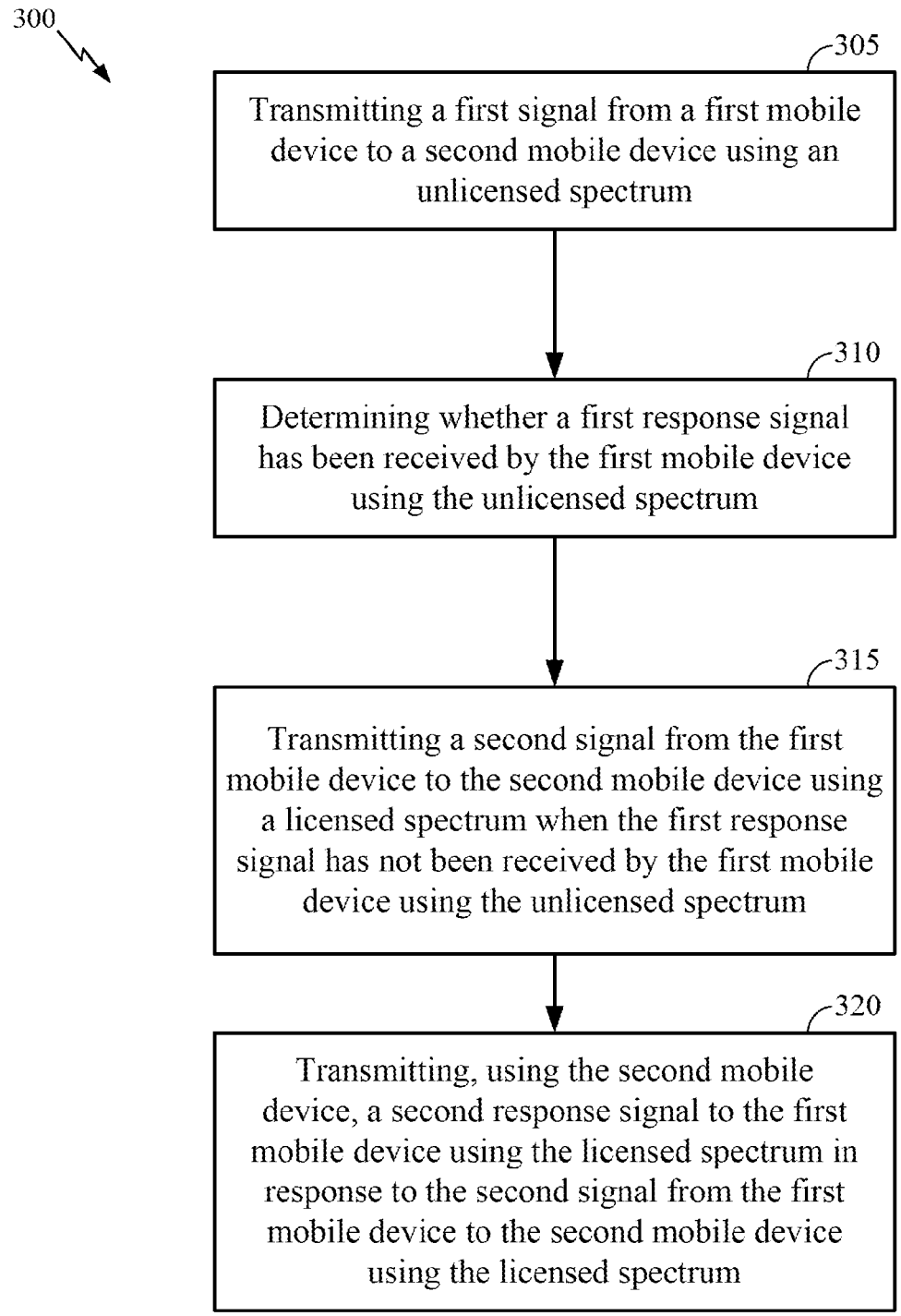
FIG. 3 is a flow diagram illustrating a method of increasing power efficiency and decreasing latency of the wireless communications device using an out of band wireless resource in accordance with various embodiments.

FIG. 3 is a flow diagram illustrating a method 300 of increasing power efficiency and decreasing latency of the wireless communications device 200 using an out of band wireless resource in accordance with various embodiments. An example of wireless communications in the licensed spectrum 115 and the unlicensed spectrum 110 may help illustrate some of the advantages of the invention (e.g., increasing power efficiency and decreasing latency of the mobile devices). Referring to FIGS. 1-3, nodes C and D can increase power efficiency and decrease latency by utilizing an out of band wireless resource which avoids the inherent delays of WiFi communications. The out of band wireless resource 115 may be a secondary channel such as the licensed spectrum. The out of band wireless resource 115 allows nodes C and D to establish wireless communications using the out of band wireless resource 115 when an in band wireless resource 110 (e.g., a primary channel such as the unlicensed spectrum) is being utilized for wireless communications by other nodes, for example, nodes A and B. For illustrative purposes, each node A, B, C and D is a wireless communications device 200 as shown in FIG. 2.

Node D (e.g., a first wireless communications device) retrieves a first signal 111 from its memory 210 and transmits, using the wireless transmitter 225 and the second antenna 240, the first signal 111 to node C (e.g., a second wireless communications device) using the unlicensed spectrum (block 305). Node C receives the first signal 111 via the second antenna 240 and the wireless receiver 230. The first signal 111 can be a control signal, a RTS signal or a data signal.

Nodes A and B are communicating using the unlicensed spectrum. Therefore, all other nodes in areas A and B (e.g., node C) should wait to transmit in the unlicensed spectrum 110. After node C receives the first signal 111 from node D, node C does not respond (i.e., does not send a response signal 116 to node D) using the unlicensed spectrum 110 due to congestion (i.e., other nodes transmitting such as node B's communication with node A in area B) of the unlicensed spectrum 110. The response signal 116 can be a control signal, a CTS signal or a data signal.

Node D does not know why node C is not responding so node D continues to try to establish communications with node C. After node D sends the first signal 111, node D waits a predetermined amount of time (e.g., 10 milliseconds) while at the same time (or approximately the same time) determines whether a response signal 116 has been received at node D from node C using the unlicensed spectrum 110 (block 310). If no response signal 116 is received from node C, node D waits an extended period of time (e.g., 20 milliseconds) and then sends another signal 111 to node C. In WiFi communications, each subsequent time node D sends a signal 111 to node C, the delay may be longer. Hence, nodes C and D experience increased latency. Node D may experience long-term starvation.

After sending the first signal 111 to node C using the unlicensed spectrum 110, node D may send a second signal 112 to node C using the licensed spectrum 115. The second signal 112 can be a control signal, a RTS signal or a data signal. In one embodiment, after a predetermined number (e.g., 1, 2, 3, 4, 5, etc.) of unsuccessful attempts by node D to establish communications with node C (i.e., no response signal 116 received by node D from node C) using the unlicensed spectrum 110, node D sends the second signal 112 to node C using the licensed spectrum 115 (block 315). The second signal 112 may be sent using the wireless transmitter 225 and the first antenna 235. Node C may send a response signal 117 to node D to establish wireless communications using the licensed spectrum 115 (block 320). Thereafter, nodes C and D may transmit data using the licensed spectrum 115.

Figure 4:
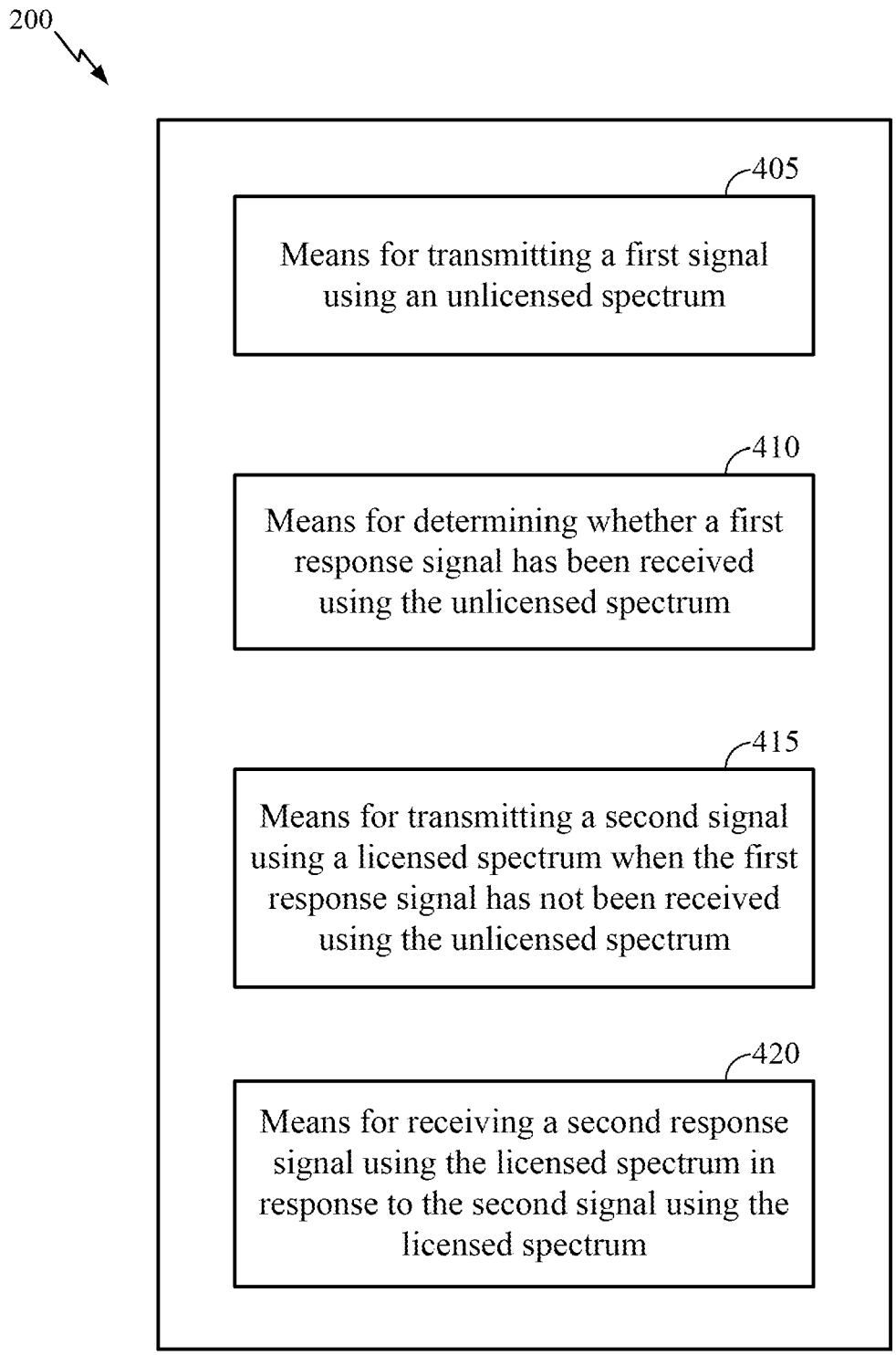
FIG. 4 is a block diagram illustrating exemplary components for the apparatus and the means for apparatus for increasing power efficiency and decreasing latency of communication of the wireless communications device using an out of band wireless resource in accordance with various embodiments.

FIG. 4 is a block diagram illustrating exemplary components for the apparatus and the means for apparatus for increasing power efficiency and decreasing latency of communication of the wireless communications device 200 using an out of band wireless resource in accordance with various embodiments. The apparatus may include a module 405 for transmitting a first signal 111 from a first mobile device 104 to a second mobile device 103 using an unlicensed spectrum 110, a module 410 for determining whether a response signal 116 has been received by the first mobile device 104 using the unlicensed spectrum 110, a module 415 for transmitting a second signal 112 from the first mobile device 104 to the second mobile device 103 using a licensed spectrum 115 when the response signal 116 has not been received by the first mobile device 104 using the unlicensed spectrum 110, and a module 420 for receiving a second response signal 117 using the licensed spectrum 115 in response to the second signal 112 from the first mobile device 104 to the second mobile device 103 using the licensed spectrum 115.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

The invention claimed is:

1. A method of using a licensed spectrum to transmit data when an unlicensed spectrum is congested, the method comprising:

transmitting a first signal from a first mobile device to a second mobile device using an unlicensed spectrum;

determining, at the first mobile device, whether a first response signal from the second mobile device has been received by the first mobile device using the unlicensed spectrum, wherein the second mobile device does not send the first response signal when the unlicensed spectrum is congested, and wherein the second mobile device determines that the unlicensed spectrum is congested when a third mobile device within a communication area of the second mobile device transmits a third signal using the unlicensed spectrum; and transmitting a second signal from the first mobile device to the second mobile device using a licensed spectrum when the first response signal has not been received by the first mobile device using the unlicensed spectrum.

2. The method of claim 1 further comprising:
receiving, at the first mobile device, a second response signal from the second mobile device using the licensed spectrum in response to the second signal from the first mobile device to the second mobile device using the licensed spectrum.

3. The method of claim 2 further comprising:
determining, at the first mobile device, whether the second response signal from the second mobile device has been received by the first mobile device; and
transmitting a data signal from the first mobile device to the second mobile device using the licensed spectrum if the second response signal from the second mobile device has been received by the first mobile device.

4. The method of claim 2 wherein the second response signal is selected from a group consisting of a control signal, a clear to send (CTS) signal, an acknowledgement (ACK) signal and a data signal.

5. The method of claim 1 wherein the first signal is selected from a group consisting of a control signal, a request to send (RTS) signal, and a data signal.

6. The method of claim 1 wherein the first response signal is selected from a group consisting of a control signal, a clear to send (CTS) signal, an acknowledgement (ACK) signal and a data signal.

7. The method of claim 1 wherein the second signal is selected from a group consisting of a control signal, a request to send (RTS) signal, and a data signal.

8. An apparatus for using a licensed spectrum to transmit data when an unlicensed spectrum is congested, the apparatus comprising:
a processor configured to:
transmit a first signal to a mobile device using an unlicensed spectrum;
determine whether a first response signal from the mobile device has been received using the unlicensed spectrum, wherein the mobile device does not send the first response signal when the unlicensed spectrum is congested, and wherein the mobile device determines that the unlicensed spectrum is congested when another mobile device within a communication area of the mobile device transmits another signal using the unlicensed spectrum; and
transmit a second signal to the mobile device using a licensed spectrum when the first response signal has not been received using the unlicensed spectrum.

9. The apparatus of claim 8 wherein the processor is further configured to:
receive a second response signal from the mobile device using the licensed spectrum in response to the second signal using the licensed spectrum.

10. The apparatus of claim 9 wherein the processor is further configured to:
determine whether the second response signal from the mobile device has been received; and
transmit a data signal to the mobile device using the licensed spectrum if the second response signal from the mobile device has been received.

11. The apparatus of claim 9 wherein the second response signal is selected from a group consisting of a control signal, a clear to send (CTS) signal, an acknowledgement (ACK) signal and a data signal.

12. The apparatus of claim 8 wherein the first signal is selected from a group consisting of a control signal, a request to send (RTS) signal, and a data signal.

13. The apparatus of claim 8 wherein the first response signal is selected from a group consisting of a control signal, a clear to send (CTS) signal, an acknowledgement (ACK) signal and a data signal.

14. The apparatus of claim 8 wherein the second signal is selected from a group consisting of a control signal, a request to send (RTS) signal, and a data signal.

15. An apparatus for using a licensed spectrum to transmit data when an unlicensed spectrum is congested, the apparatus comprising:
means for transmitting a first signal to a mobile device using an unlicensed spectrum;
means for determining whether a first response signal from the mobile device has been received using the unlicensed spectrum, wherein the mobile device does not send the first response signal when the unlicensed spectrum is congested, and wherein the mobile device determines that the unlicensed spectrum is congested when another mobile device within a communication area of the mobile device transmits another signal using the unlicensed spectrum; and
means for transmitting a second signal to the mobile device using a licensed spectrum when the first response signal has not been received using the unlicensed spectrum.

16. The apparatus of claim 15 further comprising:
means for receiving a second response signal from the mobile device using the licensed spectrum in response to the second signal using the licensed spectrum.

17. The apparatus of claim 16 further comprising:
means for determining whether the second response signal from the mobile device has been received; and
means for transmitting a data signal to the mobile device using the licensed spectrum if the second response signal from the mobile device has been received.

18. The apparatus of claim 16 wherein the second response signal is selected from a group consisting of a control signal, a clear to send (CTS) signal, an acknowledgement (ACK) signal and a data signal.

19. The apparatus of claim 15 wherein the first signal is selected from a group consisting of a control signal, a request to send (RTS) signal, and a data signal.

20. The apparatus of claim 15 wherein the first response signal is selected from a group consisting of a control signal, a clear to send (CTS) signal, an acknowledgement (ACK) signal and a data signal.

21. The apparatus of claim 15 wherein the second signal is selected from a group consisting of a control signal, a request to send (RTS) signal, and a data signal.

22. A non-transitory machine readable medium which stores machine executable instructions to perform the following:
transmitting a first signal from a first mobile device to a second mobile device using an unlicensed spectrum;
determining, at the first mobile device, whether a first response signal from the second mobile device has been received by the first mobile device using the unlicensed spectrum, wherein the second mobile device does not send the first response signal when the unlicensed spectrum is congested, and wherein the second mobile device determines that the unlicensed spectrum is congested when a third mobile device within a communication area of the second mobile device transmits a third signal using the unlicensed spectrum; and
transmitting a second signal from the first mobile device to the second mobile device using a licensed spectrum when the first response signal has not been received by the first mobile device using the unlicensed spectrum.

23. The non-transitory machine readable medium which stores instructions executable by a machine of claim 22 further causing the machine to perform the following:
   receiving, at the first mobile device, a second response signal from the second mobile device using the licensed spectrum in response to the second signal from the first mobile device to the second mobile device using the licensed spectrum.

24. The non-transitory machine readable medium which stores instructions executable by a machine of claim 23 further causing the machine to perform the following:
   determining, at the first mobile device, whether the second response signal from the second mobile device has been received by the first mobile device; and
   transmitting a data signal from the first mobile device to the second mobile device using the licensed spectrum if the second response signal from the second mobile device has been received by the first mobile device.

25. The non-transitory machine readable medium which stores instructions executable by a machine of claim 23 wherein the second response signal is selected from a group consisting of a control signal, a clear to send (CTS) signal, an acknowledgement (ACK) signal and a data signal.

26. The non-transitory machine readable medium which stores instructions executable by a machine of claim 22 wherein the first signal is selected from a group consisting of a control signal, a request to send (RTS) signal, and a data signal.

27. The non-transitory machine readable medium which stores instructions executable by a machine of claim 22 wherein the first response signal is selected from a group consisting of a control signal, a clear to send (CTS) signal, an acknowledgement (ACK) signal and a data signal.

28. The non-transitory machine readable medium which stores instructions executable by a machine of claim 22 wherein the second signal is selected from a group consisting of a control signal, a request to send (RTS) signal, and a data signal.

* * * * *